US008854839B2

(12) United States Patent
Cheng et al.

(10) Patent No.: US 8,854,839 B2
(45) Date of Patent: Oct. 7, 2014

(54) AC-TO-DC POWER CONVERTING DEVICE

(75) Inventors: Chun-An Cheng, Kaohsiung (TW); Chun-Hsien Yen, Kaohsiung (TW); Kun-Jheng Lin, Kaohsiung (TW)

(73) Assignee: I Shou University, Kaohsiung (TW)

( * ) Notice: Subject to any disclaimer, the term of this patent is extended or adjusted under 35 U.S.C. 154(b) by 164 days.

(21) Appl. No.: 13/081,650

(22) Filed: Apr. 7, 2011

(65) Prior Publication Data

US 2011/0317450 A1  Dec. 29, 2011

(30) Foreign Application Priority Data

Jun. 29, 2010 (TW) .............................. 99121219 A (51) Int. Cl.
*H02M 3/335* (2006.01)
*H02M 1/42* (2007.01)
*G05F 5/00* (2006.01)

(52) U.S. Cl.
CPC ............ *H02M 1/4258* (2013.01); *Y02B 70/126* (2013.01); *H02M 1/4241* (2013.01)
USPC ...................................... 363/21.02; 323/207

(58) Field of Classification Search
USPC ........................................... 363/21.01–21.02
See application file for complete search history.

(56) References Cited

U.S. PATENT DOCUMENTS

| 5,224,025 | A * | 6/1993 | Divan et al. ..................... 363/16 |
| 5,488,269 | A * | 1/1996 | El-Hamamsy et al. ....... 315/307 |
| 6,101,108 | A * | 8/2000 | Wittenbreder, Jr. ............ 363/65 |
| 6,344,986 | B1 * | 2/2002 | Jain et al. ........................ 363/89 |
| 6,753,798 | B2 * | 6/2004 | Feldtkeller .................... 341/143 |
| 6,834,002 | B2 * | 12/2004 | Yang .............................. 363/89 |
| 7,576,299 | B2 * | 8/2009 | Rossetto et al. ......... 219/130.21 |
| 8,248,825 | B2 * | 8/2012 | Decraemer ............... 363/21.01 |
| 2009/0316443 | A1 * | 12/2009 | Coccia et al. ............ 363/21.06 |
| 2011/0149613 | A1 * | 6/2011 | Lanni ........................ 363/21.12 |

* cited by examiner

*Primary Examiner* — Adolf Berhane
*Assistant Examiner* — Henry Lee, III
(74) *Attorney, Agent, or Firm* — Alan Kamrath; Kamrath IP Lawfirm, P.A.

(57) ABSTRACT

An AC-to-DC power converting device includes: a filter for filtering an external AC input voltage; a rectifier for rectifying the AC input voltage filtered by the filter to output a rectified voltage; a power factor corrector for receiving the rectified voltage from the rectifier to generate a boosted voltage; and a step-down converter for receiving the boosted voltage from the power factor corrector to output a DC output voltage. The power factor corrector includes first and second capacitors connected in series across an output side of the rectifier, a series connection of a first diode, a first inductor, a third capacitor, a second inductor and a second diode coupled to the output side of the rectifier, and first and second switches connected in series across the third capacitor. A common node between the first and second capacitors is coupled to a common node between the first and second switches.

13 Claims, 13 Drawing Sheets

AC-TO-DC POWER CONVERTING DEVICE

CROSS-REFERENCE TO RELATED APPLICATION

This application claims priority of Taiwanese Application No. 099121219, filed on Jun. 29, 2010.

BACKGROUND OF THE INVENTION

1. Field of the Invention

The invention relates to a power converting device, and more particularly to an AC-to-DC power converting device.

2. Description of the Related Art

Figure 1:
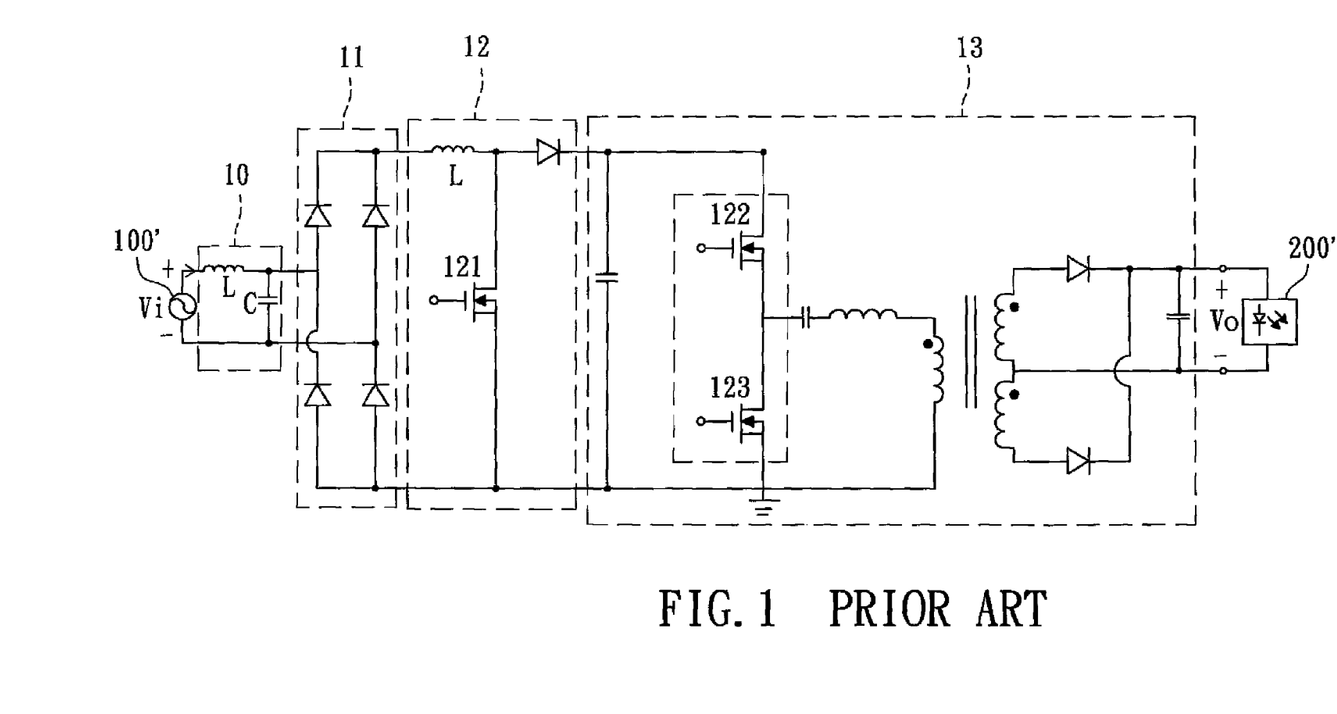
FIG. 1 is a schematic electrical circuit diagram illustrating a conventional power converting device.

FIG. 1 illustrates a conventional power converting device for converting an AC input voltage ($v_i$) supplied by an external power source 100' to a DC output voltage ($V_o$) that is adapted for driving an LED module 200' that serves as a load. The conventional power converting device includes a filter 10, a full-bridge rectifier 11, a power factor corrector 12, and a step-down converter 13.

The filter 10 is coupled to the external power source 100', and receives the AC input voltage ($v_i$) for filtering the AC input voltage ($v_i$) to eliminate electromagnetic interference.

The full-bridge rectifier 11 has an input side coupled to the filter 10 for receiving the AC input voltage ($v_i$) filtered by the filter 10, and an output side. The rectifier 11 rectifies the AC input voltage ($v_i$) to output a rectified voltage at the output side.

The power factor corrector 12 is coupled to the output side of the rectifier 11 for receiving the rectified voltage to output a boosted voltage. The power factor corrector 12 includes an inductor (L), a first switch 121, a capacitor (C), a second switch 122 and a third switch 123. The first switch 121 is operable to enable the inductor (L) to store energy or release energy. The second and third switches 122, 123 have zero-voltage switching characteristics, and are operable so that the power factor corrector 12 outputs the boosted voltage to the step-down converter 13.

The step-down converter 13 is coupled to the power factor corrector 12 and receives the boosted voltage from the power factor corrector 12 for reducing the boosted voltage to output the DC output voltage ($V_o$).

The following are some of the drawbacks of the conventional power converting device:

1. The first switch 121 of the power factor corrector 12 is required to have a high endurance voltage such that a relatively large conducting impedance is exhibited by the first switch 121.

2. A relatively large current flows through the inductor (L) of the power factor corrector 12. Therefore, the inductor (L) has increased power consumption, and a relatively large volume.

3. There are three switches 121, 122, 123 required in the conventional power converting device.

4. Zero-voltage switching characteristics of the second and third switches 122, 123 are associated with the load. When the load is extremely small, an extremely small resonant current generated in the power factor corrector 12 to flow through the second and third switches 122, 123 cannot eliminate energy stored in parasitic capacitances of the second and third switches 122, 123. Therefore, zero-voltage switching of the second and third switches 122, 123 cannot be attained.

SUMMARY OF THE INVENTION

Therefore, an object of the present invention is to provide a power converting device that can overcome the aforesaid drawbacks of the prior art.

According to the present invention, there is provided a power converting device for converting an AC input voltage supplied by an external power source to a DC output voltage. The power converting device comprises:

a filter adapted to be coupled to the external power source for filtering the AC input voltage therefrom to eliminate high-frequency noises;

a rectifier having an input side coupled to the filter for receiving the AC input voltage filtered by the filter, and an output side, the rectifier rectifying the AC input voltage received at the input side to output a rectified voltage at the output side;

a power factor corrector for receiving the rectified voltage from the rectifier to generate a boosted voltage, the power factor corrector including first and second capacitors connected in series across the output side of the rectifier, a first series connection of a first diode and a first inductor coupled to the first capacitor, a second series connection of a second diode and a second inductor coupled to the second capacitor, a third capacitor coupled between the first and second series connections, and first and second switches connected in series across the third capacitor, the first switch being coupled to the first series connection, the second switch being coupled to the second series connection, a common node between the first and second switches being coupled to a common node between the first and second capacitor, each of the first and second switches being operable between an ON-state and an OFF-state, the first and second switches being operated alternately in the ON-state based on first and second control signals, when one of the first and second switches is in the ON-state, the other one of the first and second switches being in the OFF-state, a voltage across the second switch serving as the boosted voltage; and a step-down converter coupled to the power factor corrector for receiving the boosted voltage therefrom to output the DC output voltage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
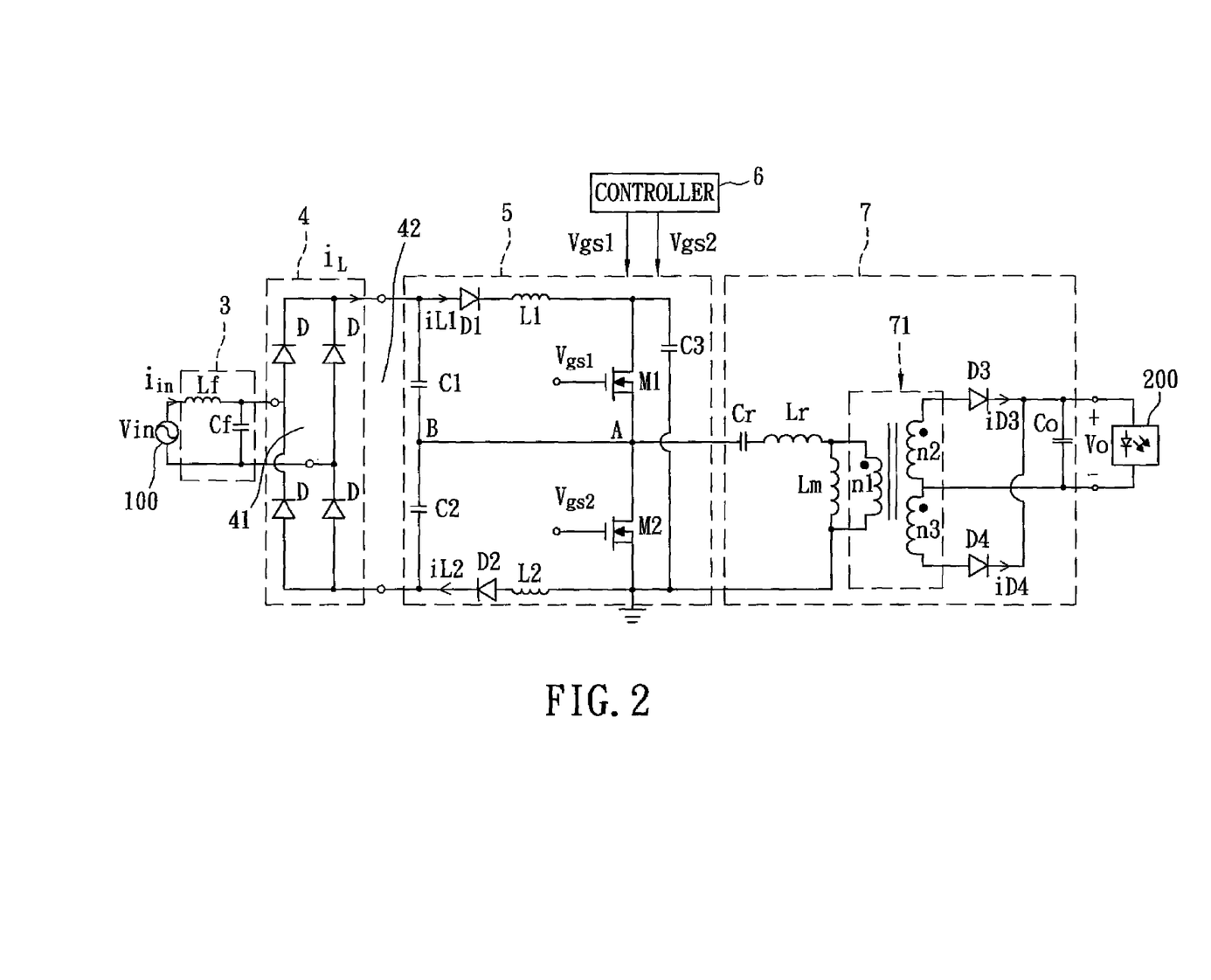
FIG. 2 is a schematic electrical circuit diagram illustrating the preferred embodiment of a power converting device according to the present invention.

Referring to FIG. 2, the preferred embodiment of a power converting device according to the present invention is shown to be adapted for converting an AC input voltage ($v_{in}$) supplied by an external power source 100 to a DC output voltage ($V_o$). The DC output voltage ($V_o$) is used to drive an LED module 200 that serves as a load. The power converting device includes a filter 3, a full-bridge rectifier 4, a power factor corrector 5, a controller 6, and a step-down converter 7.

The filter 3 includes an input inductor (Lf) and an input capacitor (Cf) connected in series, and is adapted to be coupled to the external power source 100 for filtering the AC input voltage ($v_{in}$) therefrom to eliminate high-frequency noises and electromagnetic interference.

The rectifier 4 includes four diodes (D), and has an input side 41 coupled across the capacitor (Cf) of the filter 3 for receiving the AC input voltage ($v_{in}$) filtered by the filter 3, and an output side 42. The rectifier 4 rectifies the AC input voltage ($v_{in}$) received at the input side 41 to output a rectified voltage at the output side 42.

The power factor corrector 5 receives the rectified voltage from the rectifier 4 to generate a boosted voltage. The power factor corrector 5 include first and second capacitors (C1, C2), a first series connection of a first diode (D1) and a first inductor (L1), a second series connection of a second diode (D2) and a second inductor (L2), first and second switches (M1, M2), and a third capacitor (C3). The first and second capacitors (C1, C2) are connected in series across the output side 42 of the rectifier 4. The first diode (D1) has an anode coupled to the first capacitor (C1), and a cathode coupled to the first inductor (L1). The second diode (D2) has an anode coupled to the second inductor (L2), and a cathode coupled to the second capacitor (C2). The first and second switches (M1, M2) are connected in series between the first and second inductors (L1, L2), wherein the first switch (M1) is coupled to the first inductor (L1), and the second switch (M2) is coupled to the second inductor (M2). A common node (A) between the first and second switches (M1, M2) is coupled to a common node (B) between the first and second capacitors (C1, C2). Each of the first and second switches (M1, M2) is operable between an ON-state and an OFF-state. It is noted that, based on the first and second control signals ($V_{gs1}$, $V_{gs2}$) shown in FIGS. 3a and 3b, the first and second switches (M1, M2) are operated alternately in the ON-state. When one of the first and second switches (M1, M2) is in the ON-state, the other one of the first and second switches (M1, M2) is in the OFF-state. A voltage (i.e., $V_{ds2}$) across the second switch (M2) serves as the boosted voltage. The third capacitor (C3) is coupled between the first and second inductors (L1, L2). By operation of the first and second switches (M1, M2), the power factor corrector 5 enables a current ($i_L$) flowing thereinto to have a phase that follows a phase of the AC input voltage ($v_{in}$) to correct power factor. Thus, the AC input voltage ($v_{in}$) and an input current ($i_{in}$) from the external power source 100 are adjusted to have the same phase, thereby attaining high power factor.

The controller 6 is coupled to the power factor corrector 5 for generating the first and second control signals ($V_{gs1}$, $V_{gs2}$).

The step-down converter 7 is coupled to the power factor corrector 5 for receiving the boosted voltage therefrom to output the DC output voltage ($V_o$). In this embodiment, the step-down converter 7 has a resonant structure that includes a resonant capacitor (Cr), a resonant inductor (Lr), an exciting inductance (Lm), a transformer 71, a third diode (D3), a fourth diode (D4), and an output capacitor (Co).

The resonant capacitor (Cr), the resonant inductor (Lr) and the exciting inductance (Lm) are connected in series across the second switch (M2) of the power factor connector 5.

The transformer 71 includes first, second and third windings (n1, n2, n3) wound around an iron core (not shown). A winding ratio of the first, second and third windings (n1, n2, n3) is equal to N1:N2:N3, where N1>N2, and N1>N3. Each of the first, second and third windings (n1, n2, n3) has a polarity end and a non-polarity end. The polarity end of the first winding (n1) is coupled to a common node between the resonant inductor (Lr) and the exciting inductance (Lm). The non-polarity end of the first winding (n1) is coupled to a common node among the exciting inductance (Lm), the second switch (M2) and the second inductor (L2). The polarity end of the second winding (n2) is coupled to an anode of the third diode (D3). The polarity end of the third winding (n3) is coupled to the non-polarity end of the second winding (n2) and one end of the output capacitor (Co). The non-polarity end of the third winding (n3) is coupled to an anode of the fourth diode (D4). The other end of the output capacitor (Co) is coupled to cathodes of the third and fourth diodes (D3, D4).

The output capacitor (Co) is adapted to be coupled to the LED module 200 in parallel. The DC output voltage ($V_o$) is a voltage across the output capacitor (Co).

Figure 3A:
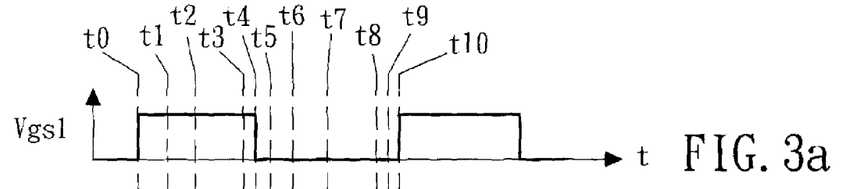
FIGS. 3a and 3b illustrate waveforms of first and second control signals ($V_{gs1}$, $V_{gs2}$) generated by a control circuit of the preferred embodiment, respectively.
Figure 3B:
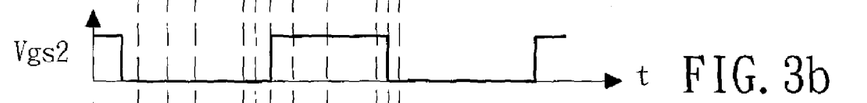
Figure 3C:
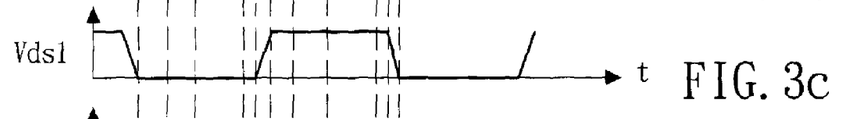
FIGS. 3c and 3d illustrate waveforms of voltages ($V_{ds1}$, $V_{ds2}$) across first and second switches of the preferred embodiment, respectively.
Figures 3D, 3E:
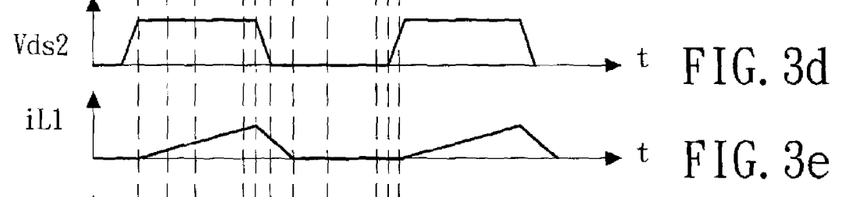
FIGS. 3e to 3h illustrate waveforms of currents ($i_{L1}$, $i_{L2}$, $i_{Lr}$, $i_{Lm}$) flowing through a first inductor, a second inductor, a resonant inductor and an exciting inductance of the preferred embodiment, respectively.
Figure 3F:
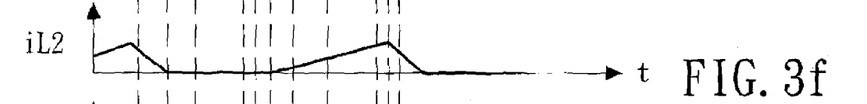
Figure 3G:
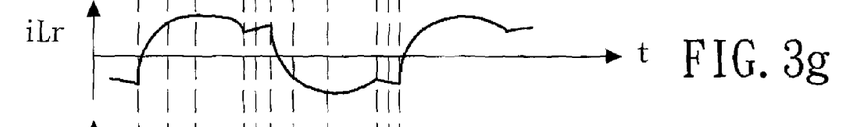
Figure 3H:
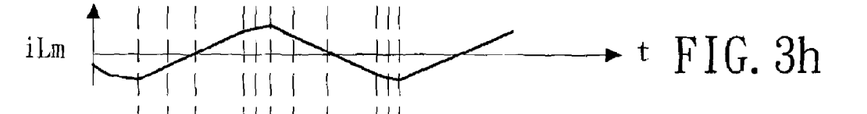
Figure 3I:
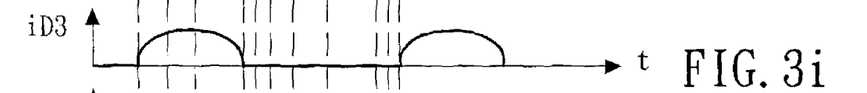
FIGS. 3i and 3j illustrate waveforms of currents ($i_{D3}$, $i_{D4}$) flowing through third and fourth diodes of the preferred embodiment, respectively.
Figure 3J:
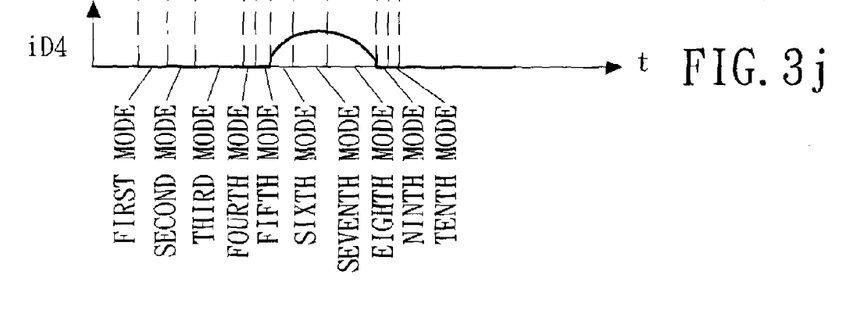
Figure 4:
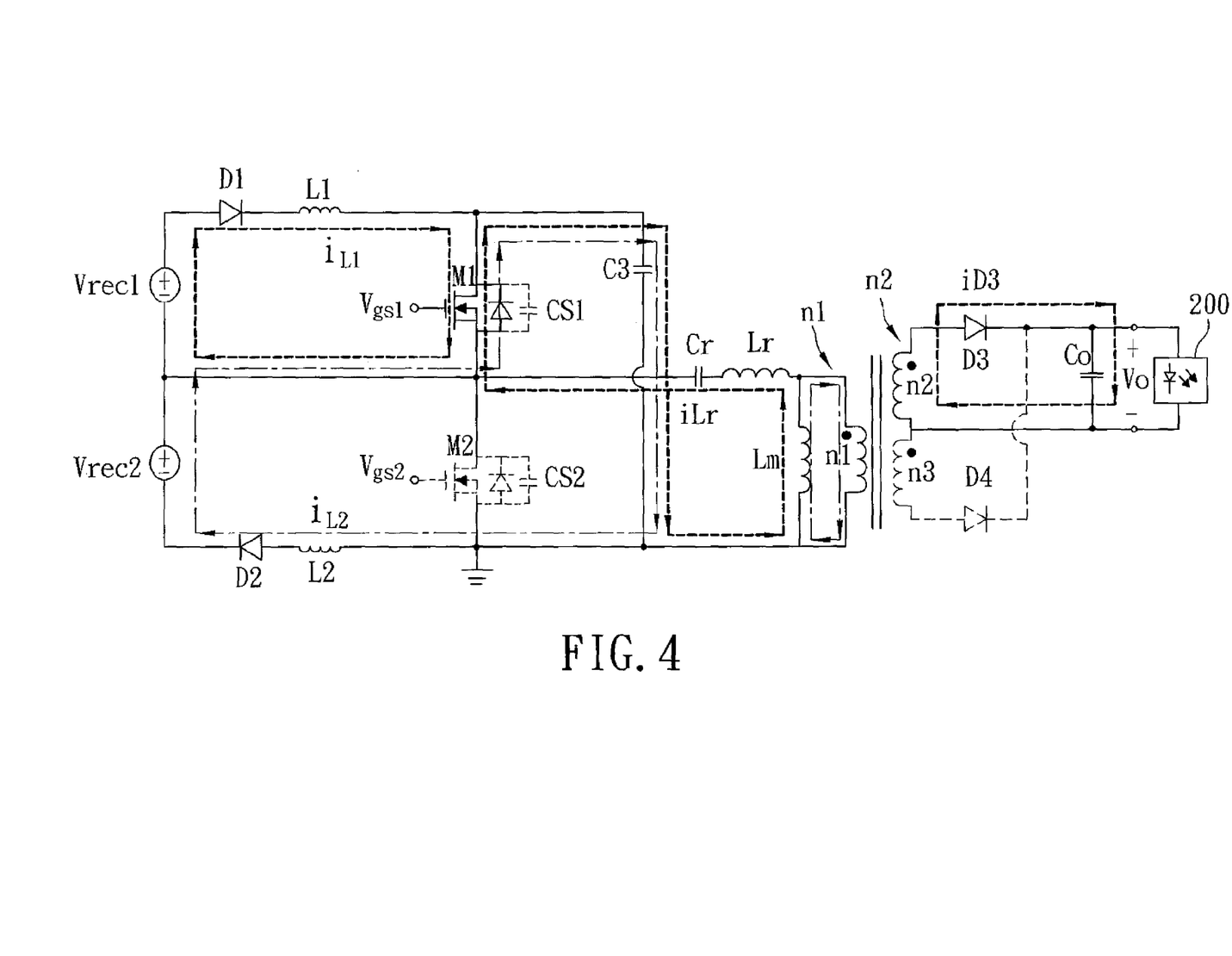
FIG. 4 is a schematic equivalent electrical circuit diagram illustrating the preferred embodiment when operated in a first mode.
Figure 5:
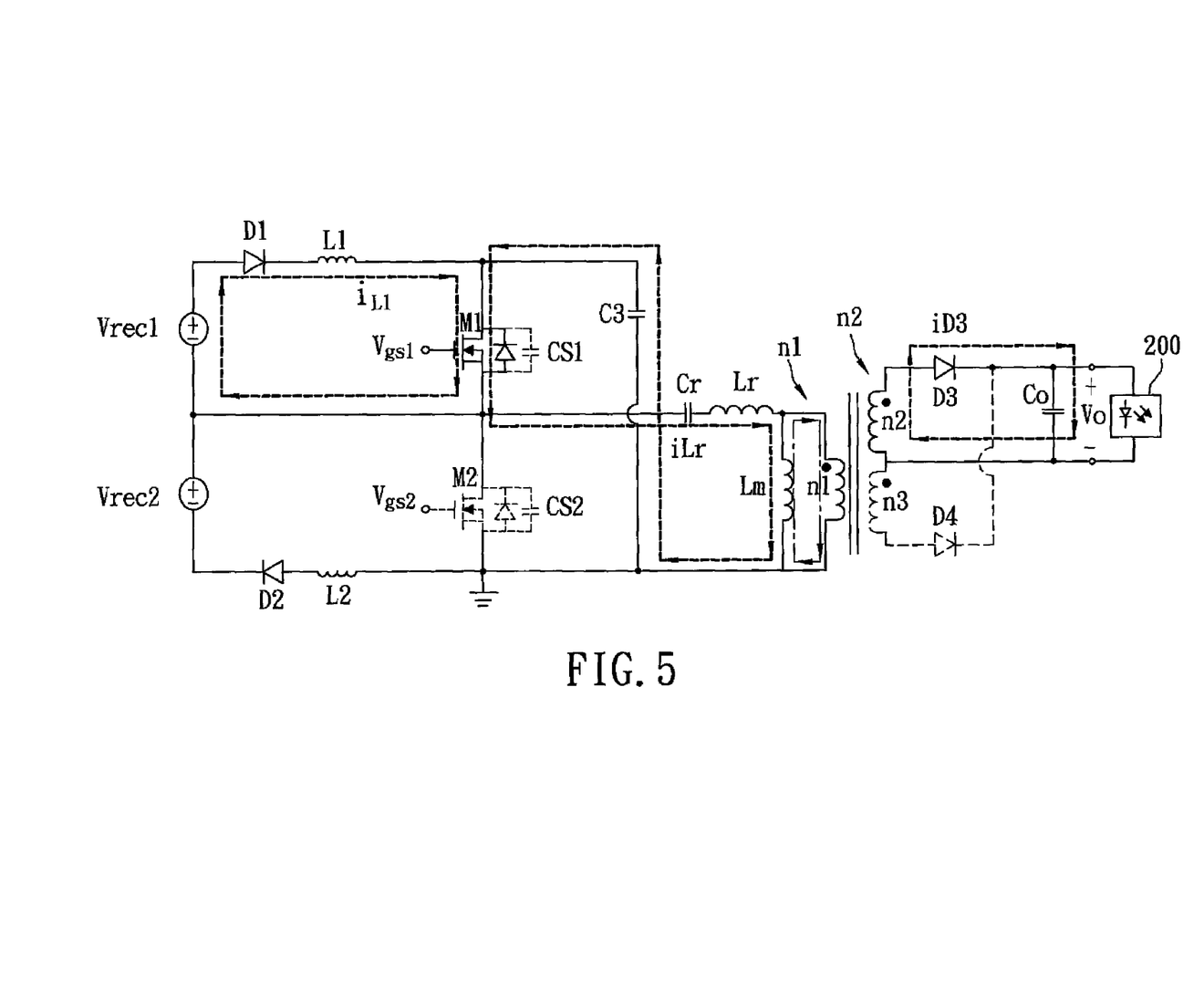
FIG. 5 is a schematic equivalent electrical circuit diagram illustrating the preferred embodiment when operated in a second mode.
Figure 6:
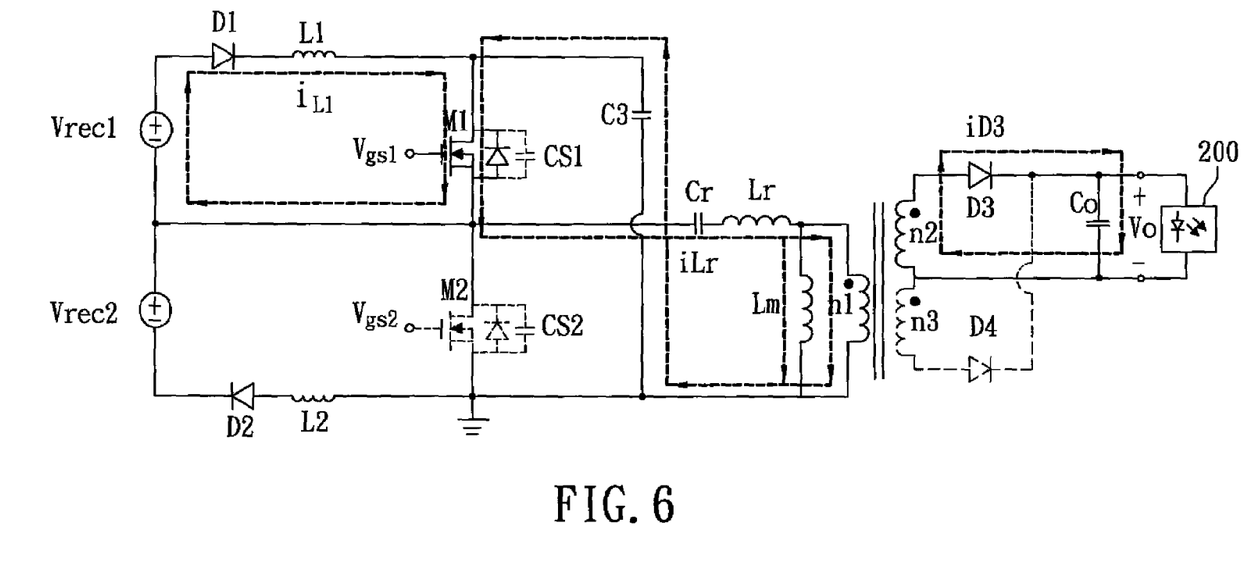
FIG. 6 is a schematic equivalent electrical circuit diagram illustrating the preferred embodiment when operated in a third mode.
Figure 7:
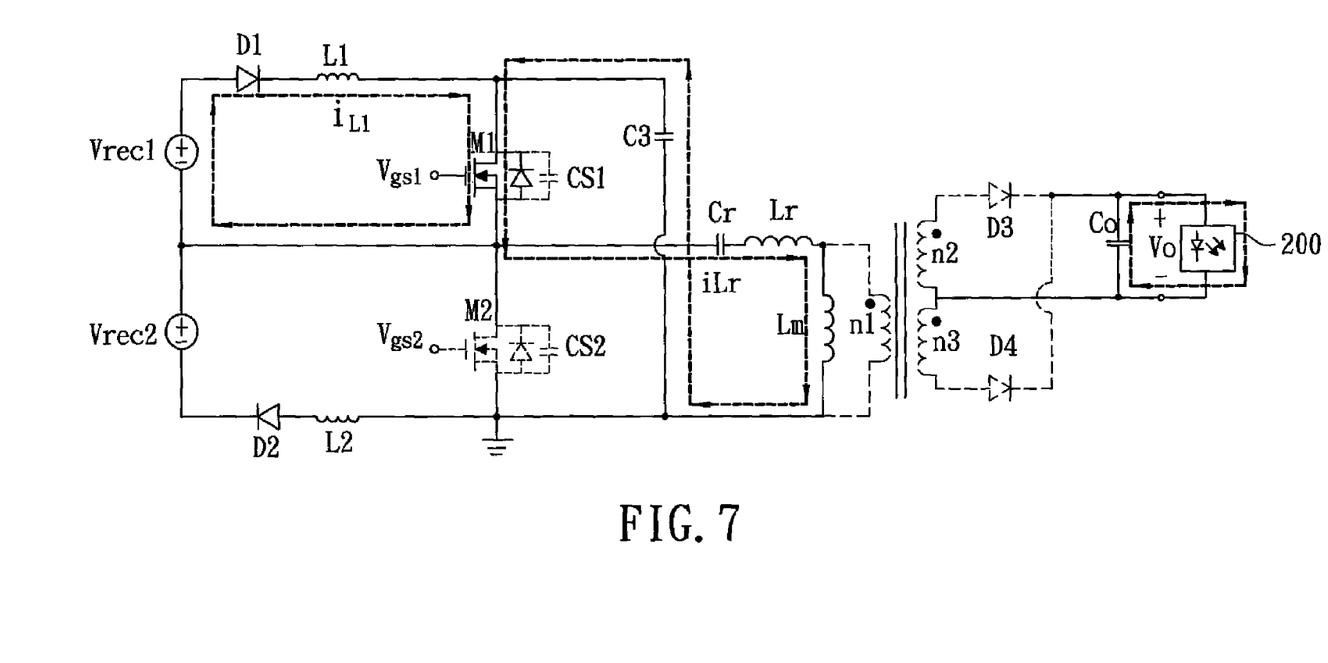
FIG. 7 is a schematic equivalent electrical circuit diagram illustrating the preferred embodiment when operated in a fourth mode.
Figure 8:
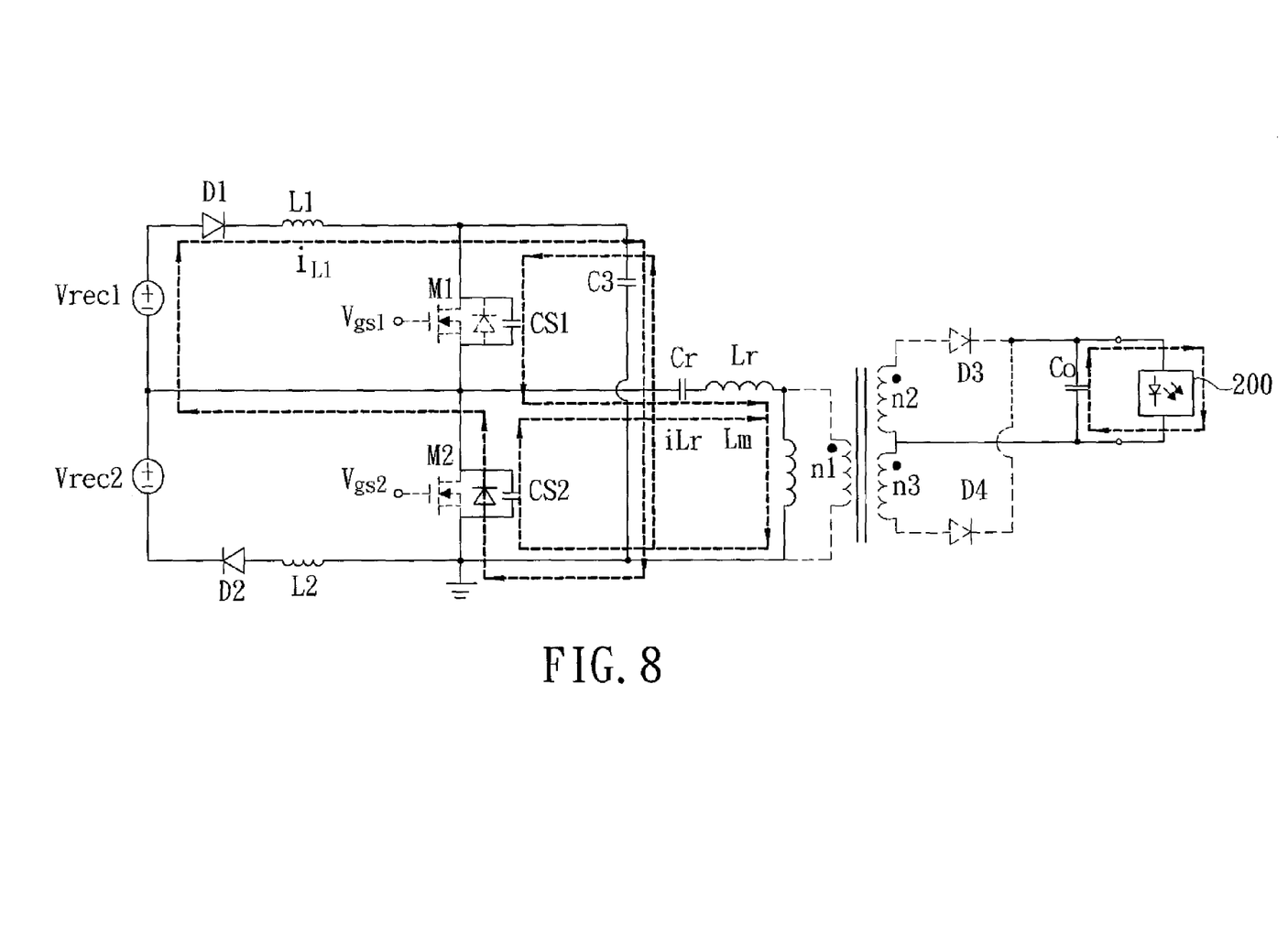
FIG. 8 is a schematic equivalent electrical circuit diagram illustrating the preferred embodiment when operated in a fifth mode.
Figure 9:
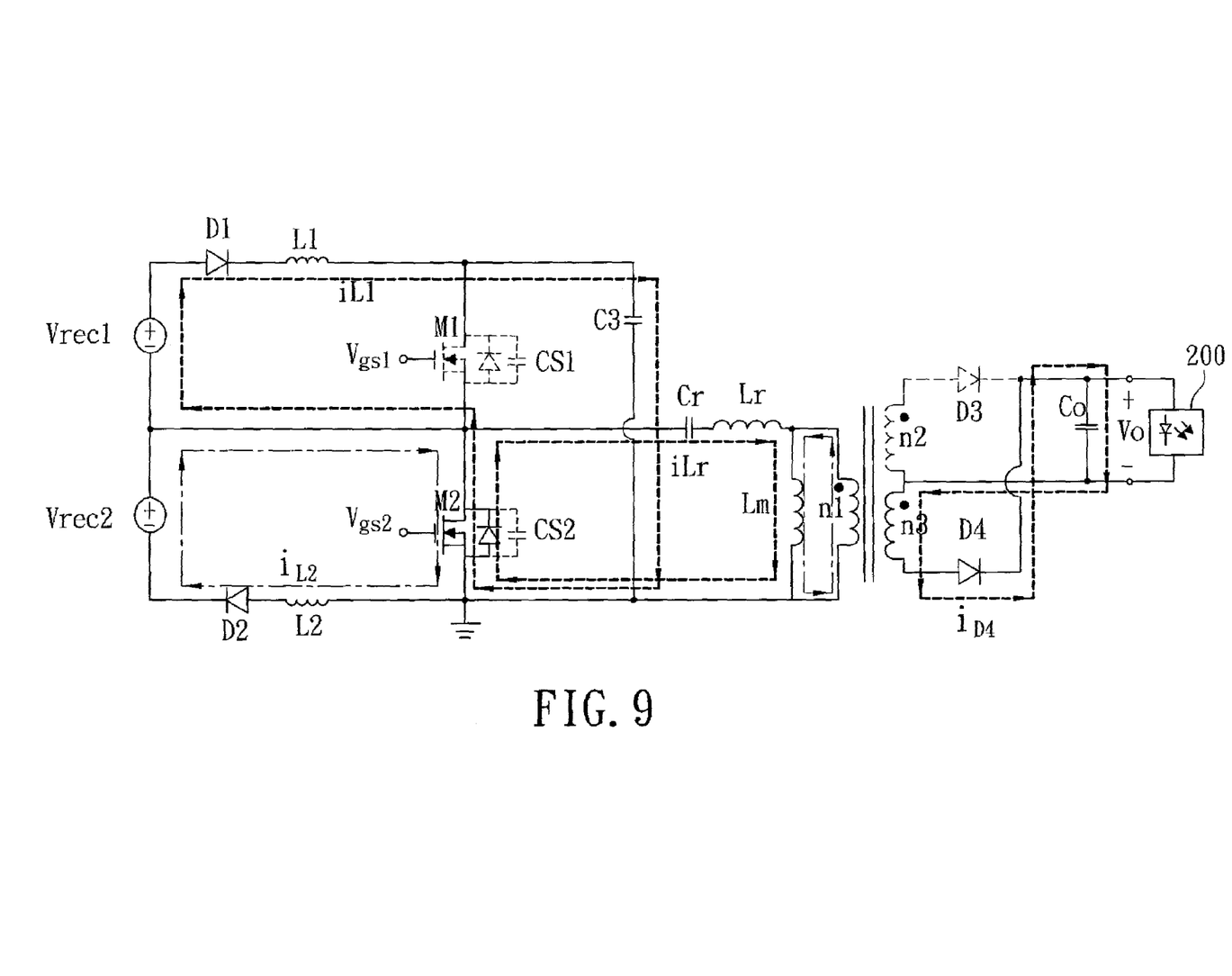
FIG. 9 is a schematic equivalent electrical circuit diagram illustrating the preferred embodiment when operated in a sixth mode.
Figure 10:
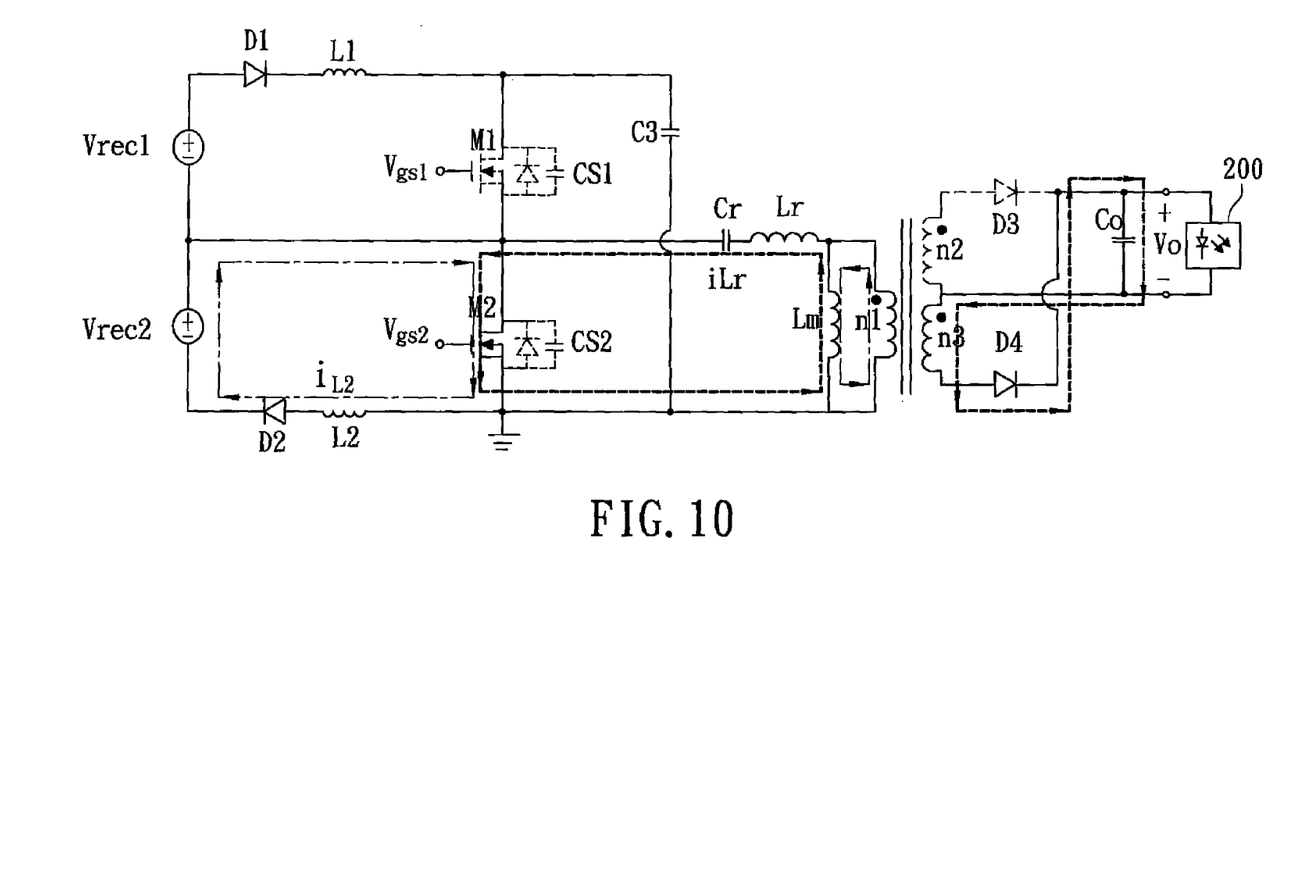
FIG. 10 is a schematic equivalent electrical circuit diagram illustrating the preferred embodiment when operated in a seventh mode.
Figure 11:
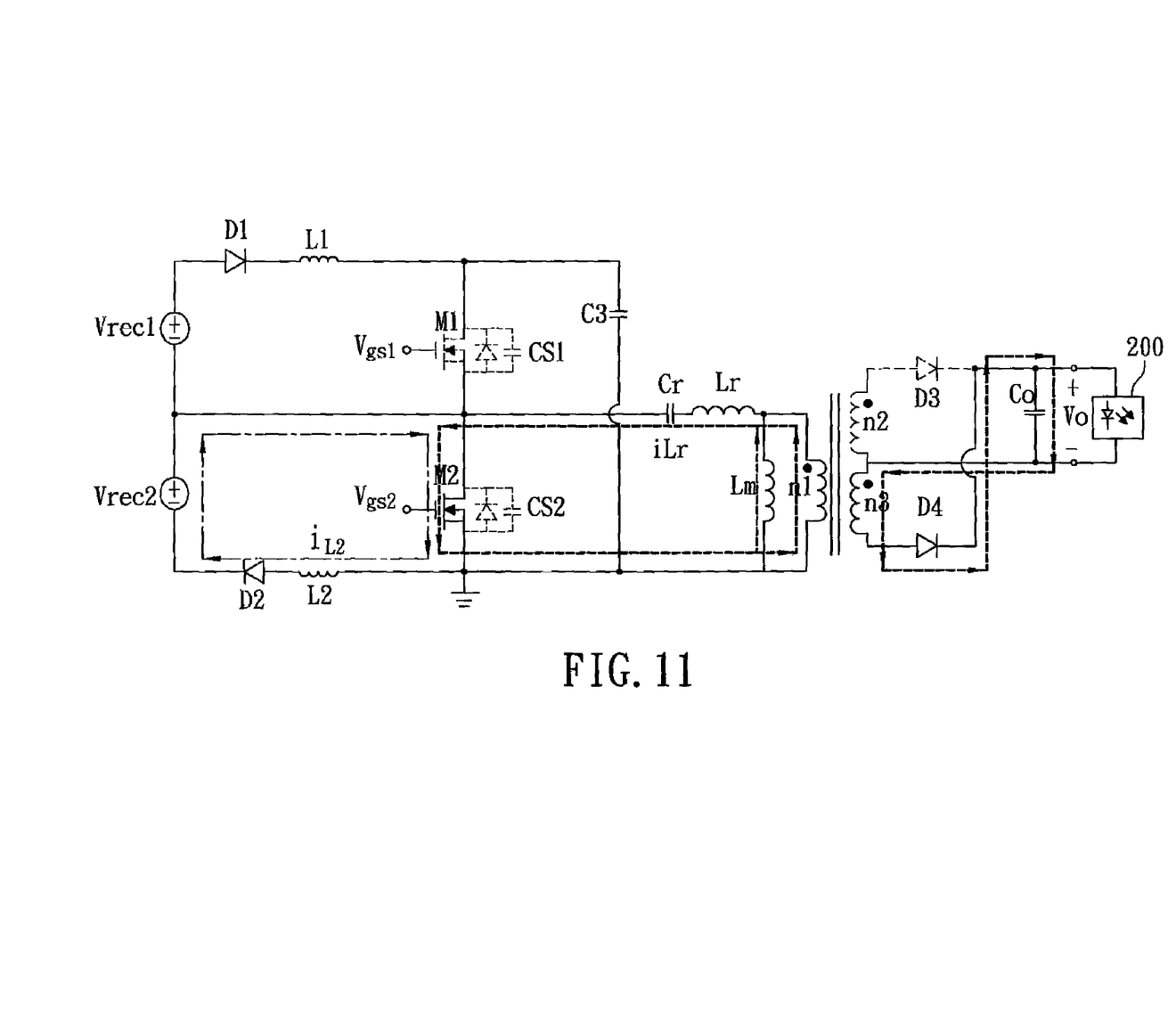
FIG. 11 is a schematic equivalent electrical circuit diagram illustrating the preferred embodiment when operated in an eighth mode.
Figure 12:
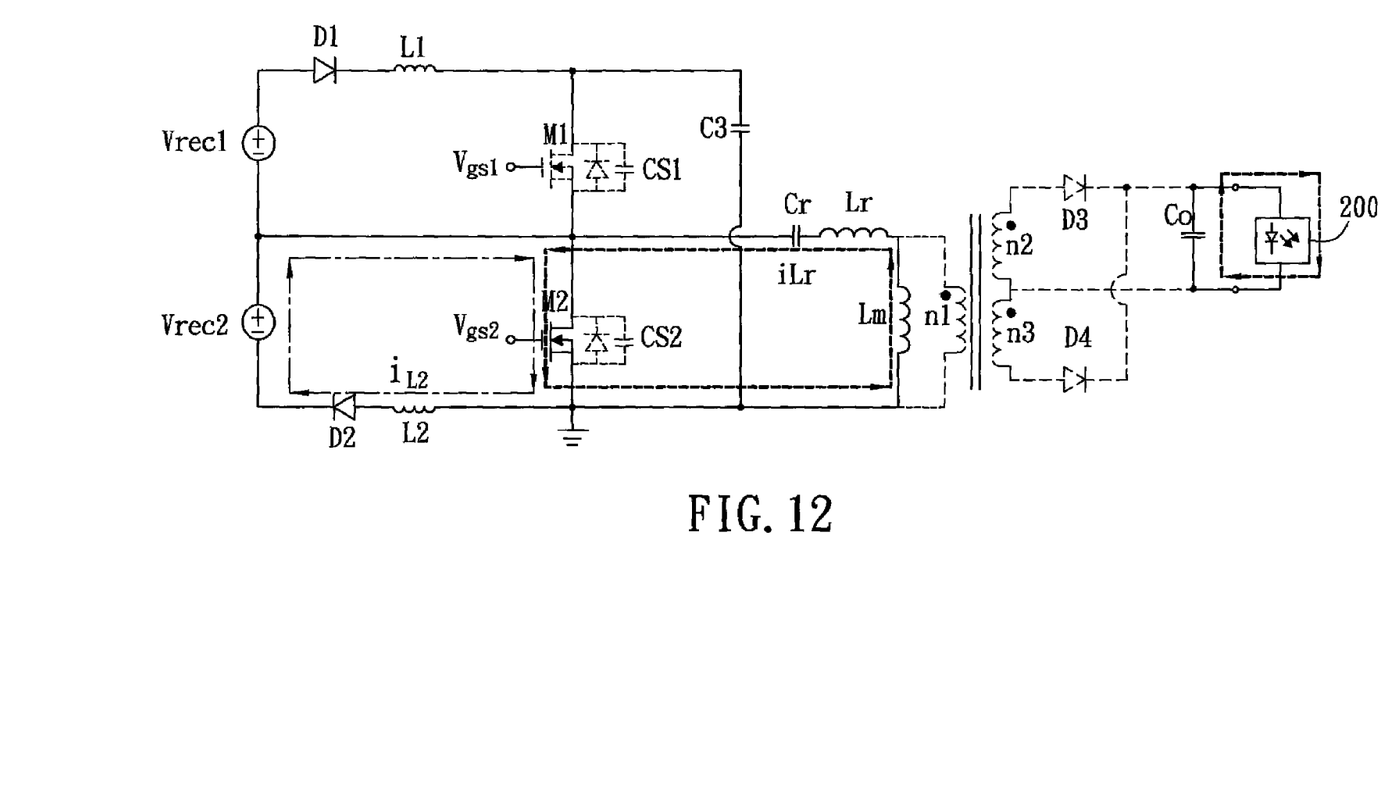
FIG. 12 is a schematic equivalent electrical circuit diagram illustrating the preferred, embodiment when operated in a ninth mode.
Figure 13:
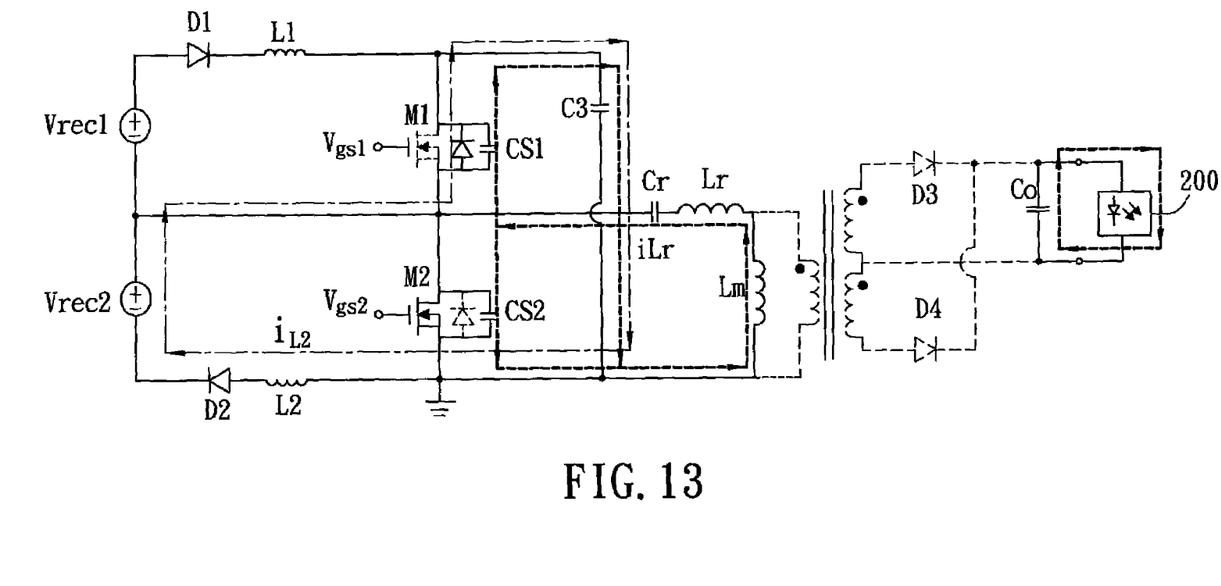
FIG. 13 is a schematic equivalent electrical circuit diagram illustrating the preferred embodiment when operated in a tenth mode.

The power converting device of the preferred embodiment is operable among first to tenth modes based on the first and second control signals ($V_{gs1}$, $V_{gs2}$) for the first and second switches (M1, M2) shown in FIGS. 3a and 3b. FIGS. 3c and 3d illustrate waveforms of voltages ($V_{ds1}$, $V_{ds2}$) across the first and second switches (M1, M2), respectively. FIGS. 3e and 3f illustrate waveforms of currents ($i_{L1}$, $i_{L2}$) flowing respectively through the first and second inductors ($L_1$, $L_2$). FIG. 3h illustrates a waveform of an exciting current ($i_{Lm}$) flowing through the exciting inductance (Lm) of the transformer 71. In FIGS. 4 to 13, Vrec1 and Vrec2 represent respectively voltages across the first and second capacitors (C1, C2) such that the sum of Vrec1 and Vrec2 is identical to the rectified voltage output at the output side 42 of the rectifier 4. In addition, conducting components are illustrated by solid-lines, and non-conducting components are illustrated by doted-lines.

Referring further to FIGS. 3a to 3j, and 4, the power converting device is operated in the first mode during a period from t0 to t1. In the first mode, the first switch (M1) is in the ON-state with zero-voltage switching, and the second switch (M2) is in the OFF-state. The first capacitor (C1) discharges with Vrec1 through the first diode (D1), the first inductor (L1) and the first switch (M1) such that the first inductor (L1) stores energy in response to the increased current ($i_{L1}$) Energy attributed to the second inductor (L2) is released through the second diode (D2) and an intrinsic diode of the first switch (M1) to charge the third capacitor (C3) such that the current ($i_{L2}$) reduces to zero at t1 (see FIG. 3f). In addition, energy attributed to the resonant inductor (Lr) is released to the resonant capacitor (Cr) through the intrinsic diode of the first switch (M1) to charge the third capacitor (C3), and energy attributed to the exciting inductance (Lm) is released to the resonant inductor (Lr) to increase the current ($i_{Lr}$) flowing through the resonant inductor (Lr) (see FIG. 3g). At the same time, due to energy releasing of the exciting inductance (Lm), energy induced by the first winding (n1) is transformed to the second winding (n2) such that a current ($i_{D3}$) flowing through the third diode (D3) increases to charge the output capacitor (Co) (see FIG. 3i).

Referring further to FIGS. 3a to 3j, and 5, the power converting device is operated in the second mode during a period from t1 to t2. In the second mode, the first switch (M1) is in the ON-state, and the second switch (M2) is in the OFF-state. The current ($i_{L1}$) increases as in the first mode. The third capacitor (C3) discharges to the exciting inductance (Lm) through the first switch (M1) such that the exciting current ($i_{Lm}$) flowing through the exciting inductance (Lm) increases to zero at t2 (see FIG. 3h). The output capacitor (Co) is charged with the slowly increased current ($i_{D3}$).

Referring further to FIGS. 3a to 3j, and 6, the power converting device is operated in the third mode during a period from t2 to t3. In the third mode, the first switch (M1) is in the ON-state, and the second switch (M2) is in the OFF-state. The current ($i_{Lr}$) flowing through the resonant inductor (Lr) gradually reduces and the exciting current ($i_{Lm}$) flowing through the exciting inductance (Lm) increases until the current ($i_{Lr}$) is equal to the exciting current ($i_{Lm}$). In addition, a portion of the current ($i_{Lr}$) flows to the first winding (n1), and the current ($i_{D3}$) gradually reduces to zero.

Referring further to FIGS. 3a to 3j, and 7, the power converting device is operated in the fourth mode during a period from t3 to t4. In the fourth mode, the first switch (M1) is in the ON-state, and the second switch (M2) is in the OFF-state. The current ($i_{L1}$) still increases. At t3, the current ($i_{Lr}$) is equal to the exciting current ($i_{Lm}$) and the current ($i_{D3}$) is zero such that the output capacitor (Co) begins to discharge to the LED module 200.

Referring further to FIGS. 3a to 3j, and 8, the power converting device is operated in the fifth mode during a period from t4 to t5. In the fifth mode, the first and second switches (M1, M2) are in the OFF-state. Energy attributed to the first inductor (L1) begins to release through an intrinsic diode of the second switch (M2) such that the current ($i_{L1}$) flowing through the first inductor (L1) reduces. In addition, the third capacitor (C3) discharges through a parasitic capacitance (CS1) of the first switch (M1), the resonant capacitor (Cr), the resonant inductor (Lr) and the exciting inductance (Lm) such that the voltage ($V_{ds1}$) across the first switch (M1) increases. At the same time, a parasitic capacitance (CS2) of the second switch (M2) discharges such that the voltage ($V_{ds2}$) across the second switch (M2) reduces to zero at t5 (see FIG. 3d). The output capacitor (Co) discharges to the LED module 200.

Referring further to FIGS. 3a to 3j, and 9, the power converting device is operated in the sixth mode during a period from t5 to t6. In the sixth mode, the first switch (M1) is in the OFF-state, and the second switch (M2) is in the ON-state with zero-voltage switching. The second capacitor (C2) discharges with Vrec2 through the second diode (D2), the second inductor (L2) and the second switch (M2) such that the second inductor (L2) stores energy in response to the increased current ($i_{L1}$). Energy attributed to the first inductor (L1) is released through the first diode (D1) and an intrinsic diode of the second switch (M2) to charge the third capacitor (C3) such that the current ($i_{L2}$) increases (see FIG. 3f). In addition, energy attributed to the resonant inductor (Lr) is released to the resonant capacitor (Cr) and the exciting inductance (Lm) through the intrinsic diode of the second switch (M2) such that the current ($i_{Lr}$) reduces, and energy attributed to the exciting inductance (Lm) is released to the first winding (n1) such that the exciting current ($i_{Lm}$) reduces. At the same time, due to energy releasing of the exciting inductance (Lm), energy induced by the first winding (n1) is transformed to the third winding (n3) such that a current ($i_{D4}$) flowing through the fourth diode (D) increases to charge the output capacitor (Co) (see FIG. 3j).

Referring further to FIGS. 3a to 3j, and 10, the power converting device is operated in the seventh mode during a period from t6 to t7. In the seventh mode, the first switch (M1) is in the OFF-state, and the second switch (M2) is in the ON-state. The current ($i_{L2}$) increases as in the sixth mode. Energy attributed to the exciting inductance (Lm) is released until the exciting current ($i_{Lm}$) reduces to zero at t7 (see FIG. 3h). The output capacitor (Co) is charged with the slowly increased current ($i_{D4}$).

Referring further to FIGS. 3a to 3j, and 11, the power converting device is operated in the eighth mode during a period from t7 to t8. In the eighth mode, the first switch (M1) is in the OFF-state, and the second switch (M2) is in the ON-state. The current ($i_{Lr}$) flowing through the resonant inductor (Lr) begins to gradually increase and the exciting current ($i_{Lm}$) flowing through the exciting inductance (Lm) reduces until the current ($i_{Lr}$) is equal to the exciting current ($i_{Lm}$).

Referring further to FIGS. 3a to 3j, and 12, the power converting device is operated in the ninth mode during a period from t8 to t9. In the ninth mode, the first switch (M1) is in the OFF-state, and the second switch (M2) is in the ON-state. The current ($i_{L2}$) still increases. At t8, the current ($i_{Lr}$) is equal to the exciting current ($i_{Lm}$) and the current ($i_{D4}$) is zero such that the output capacitor (Co) begins to discharge to the LED module 200.

Referring further to FIGS. 3a to 3j, and 13, the power converting device is operated in the tenth mode during a period from t9 to t10. In the tenth mode, the first and second switches (M1, M2) are in the OFF-state. Energy attributed to the second inductor (L2) begins to release through the intrinsic diode of the first switch (M1) such that the current ($i_{L2}$) flowing through the second inductor (L2) reduces. In addition, energy attributed to the resonant capacitor (Cr), the resonant inductor (Lr) and the exciting inductance (Lm) is released to charge the parasitic capacitance (CS2) of the second switch (M2) such that the voltage ($V_{ds2}$) across the second switch (M2) increases. At the same time, the parasitic capacitance (CS1) of the first switch (M1) discharges to the third capacitor (C3) such that the voltage ($V_{ds1}$) across the first switch (M1) reduces to zero at t10 (see FIG. 3c). The output capacitor (Co) discharges to the LED module 200.

The following are some of the advantages of the power converting device of this invention:

1. Since the rectified voltage is divided into the voltages (Vrec1, Vrec2), the currents ($i_{L1}$, $i_{L2}$) flowing respectively through the first and second inductors (L1, L2) are smaller than the current flowing through the inductor (L) of the conventional power converting device. As a result, the first and second switch (M1, M2) of the power factor corrector 5 are required to have a lower endurance voltage as compared to the first switch 121 of the conventional power converting device such that a smaller conducting impedance is exhibited by each of the first and second switches (M1, M2).

2. Due to the smaller currents ($i_{L1}$, $i_{L2}$), the first and second inductors (L1, L2) have reduced power consumption, and a relatively small volume.

3. Since only two switches (M1, M2) are used in the power factor corrector 5, the power converting device can reduce the number of the switches.

4. The first and second switches (M1, M2) can be configured so that each of the first and second switches (M1, M2) permits a current to flow through the intrinsic diode thereof to thereby reduce a corresponding one of the voltages ($V_{ds1}$, $V_{ds2}$) to zero prior to conduction. Therefore, zero-voltage switching characteristics of the first and second switches (M1, M2) can be ensured. Furthermore, the power converting device of the present invention can be suitable for various loads with large variances.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power converting device for converting an AC input voltage supplied by an external power source into a DC output voltage, comprising:
    a filter adapted to be coupled to the external power source for filtering the AC input voltage therefrom to eliminate high-frequency noises;
    a rectifier having an input side coupled to said filter for receiving the AC input voltage filtered by said filter, and an output side, said rectifier rectifying the AC input voltage received at the input side to output a rectified voltage at said output side;
    a power factor corrector for receiving the rectified voltage from said rectifier to generate a boosted voltage, said power factor corrector including
        first and second capacitors connected in a series connection that is coupled directly to and across said output side of said rectifier,
        a first series connection of a first diode and a first inductor coupled to said first capacitor,
        a second series connection of a second diode and a second inductor coupled to said second capacitor,
        a third capacitor coupled between said first and second series connections, and
        first and second switches connected in series across said third capacitor, said first switch being coupled to said first series connection, said second switch being coupled to said second series connection, a common node between said first and second switches being coupled directly to a common node between said first and second capacitors, each of said first and second switches being operable between an ON-state and an OFF-state, said first and second switches being operated alternately in the ON-state based on first and second control signals, when one of said first and second switches is in the ON-state, the other one of said first and second switches being in the OFF-state, a voltage across said second switch serving as the boosted voltage; and
    a step-down converter coupled to said power factor corrector for receiving the boosted voltage therefrom to output the DC output voltage,
    wherein said first diode has a cathode and an anode that is coupled to said first capacitor, said first inductor is coupled directly between said cathode of said first diode and said first switch, said second diode has an anode and a cathode that is coupled to said second capacitor, and said second inductor is coupled directly between said anode of said second diode and said second switch.

2. The power converting device as claimed in claim 1, wherein said rectifier is a full-bridge rectifier.

3. The power converting device as claimed in claim 1, further comprising a controller coupled to the power factor corrector for generating the first and second control signals.

4. The power converting device as claimed in claim 3, wherein said rectifier is a full-bridge rectifier.

5. The power converting device as claimed in claim 1,
    wherein said first capacitor, said first diode, and said first inductor are configured such that positive current flows from said first capacitor through the first diode from the anode of the first diode to the cathode of said first diode, and such that the positive current flows from said first diode to said first inductor; and
    wherein said second inductor, said second diode, and said second capacitor are configured such that positive current flows from said second inductor through the second diode from the anode of the second diode to the cathode of said second diode, and such that the positive current flows from said second diode to said second capacitor.

6. The power converting device as claimed in claim 1, wherein the first and second capacitors are electrically coupled in series across said output side of said rectifier regardless of whether the first switch and the second switch are in the ON-state or the OFF-state.

7. A power converting device for converting an AC input voltage supplied by an external power source into a DC output voltage, comprising:
    a rectifier having an input side for receiving an AC input voltage, and an output side, the rectifier rectifying the AC input voltage received at the input side to output a rectified voltage at the output side;
    a power factor corrector for receiving the rectified voltage from the rectifier to generate a boosted voltage, the power factor corrector including
        first and second capacitors connected in series across the output side of the rectifier,
        a first path including a first diode and a first inductor in series, the first path being coupled to the first capacitor,
        a second path including a second diode and a second inductor in series, the second path being coupled to the second capacitor,
        a third capacitor coupled between the first and second paths, and
        first and second switches connected in series across the third capacitor, the first switch being coupled to the first path, the second switch being coupled to the second path, a common node between the first and second switches being coupled to a common node between the first and second capacitors, each of the first and second switches being operable between an ON-state and an OFF-state, the first and second switches being operated alternately in the ON-state based on first and second control signals, when one of the first and second switches is in the ON-state, the other one of the first and second switches being in the OFF-state, a voltage across the second switch serving as the boosted voltage, wherein:

the first diode has an anode coupled to the first capacitor, and a cathode, the first inductor is coupled between the cathode of the first diode and the first switch, the second diode has an anode, and a cathode coupled to the second capacitor, and the second inductor is coupled between the anode of the second diode and the second switch; and a step-down converter coupled to the power factor corrector for receiving the boosted voltage therefrom to output the DC output voltage.

8. The power converting device as claimed in claim 7, wherein the rectifier is a full-bridge rectifier.

9. The power converting device as claimed in claim 7, wherein said first capacitor, said first diode, and said first inductor are configured such that positive current flows from said first capacitor through the first diode from the anode of the first diode to the cathode of said first diode, and such that the positive current flows from said first diode to said first inductor; and wherein said second inductor, said second diode, and said second capacitor are configured such that positive current flows from said second inductor through the second diode from the anode of the second diode to the cathode of said second diode, and such that the positive current flows from said second diode to said second capacitor.

10. The power converting device as claimed in claim 7, further comprising a controller coupled to the power factor corrector for generating the first and second control signals.

11. The power converting device as claimed in claim 10, wherein the rectifier is a full-bridge rectifier.

12. The power converting device as claimed in claim 7, further comprising a filter adapted to be coupled to the external power source for filtering the AC input voltage therefrom to eliminate high-frequency noises.

13. The power converting device as claimed in claim 7, wherein the first and second capacitors are coupled to the output side of the rectifier regardless of whether the first switch and the second switch are in the ON-state or the OFF-state.

* * * * *